US007771276B2

(12) United States Patent
Beatty et al.

(10) Patent No.: US 7,771,276 B2
(45) Date of Patent: Aug. 10, 2010

(54) METHOD AND APPARATUS FOR A GAMING NETWORK ARCHITECTURE

(75) Inventors: John A. Beatty, Reno, NV (US); Christopher W. Blackburn, Reno, NV (US); Rory L. Block, Carson City, NV (US); Chih-Hui Jan, Sparks, NV (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 11/143,874

(22) Filed: Jun. 2, 2005

(65) Prior Publication Data

US 2005/0282628 A1 Dec. 22, 2005

Related U.S. Application Data

(60) Provisional application No. 60/575,796, filed on Jun. 2, 2004.

(51) Int. Cl.
*A63F 13/00* (2006.01)

(52) U.S. Cl. .......................................... 463/27; 463/42

(58) Field of Classification Search ....................... None
See application file for complete search history.

(56) References Cited

U.S. PATENT DOCUMENTS

| | | | | |
|---|---|---|---|---|
| 6,289,382 | B1 | 9/2001 | Bowman-Amuah | |
| 6,312,333 | B1 * | 11/2001 | Acres | 463/25 |
| 6,319,125 | B1 * | 11/2001 | Acres | 463/25 |
| 6,358,149 | B1 * | 3/2002 | Schneider et al. | 463/27 |
| 6,430,562 | B1 | 8/2002 | Kardos et al. | |
| 6,450,887 | B1 * | 9/2002 | Mir et al. | 463/42 |
| 6,471,591 | B1 * | 10/2002 | Crumby | 463/26 |
| 6,830,515 | B2 * | 12/2004 | Rowe | 463/42 |

(Continued)

FOREIGN PATENT DOCUMENTS

WO WO-2007092608 A2 8/2007

(Continued)

OTHER PUBLICATIONS

"U.S. Appl. No. 10/629,110 Non Final Office Action mailed Jan. 24, 2007", 10 pgs.

(Continued)

*Primary Examiner*—Ronald Laneau
*Assistant Examiner*—Tramar Harper
(74) *Attorney, Agent, or Firm*—Schwegman, Lundberg & Woessner, P.A.

(57) ABSTRACT

Embodiments of the invention relate generally to wagering games and, more particularly, to a gaming network linked to a plurality of gaming machines. The gaming network has a plurality of servers dedicated to providing a shared game to a plurality of gaming terminals. The shared game may be either competitive or collaborative between players and may be a combination of both competitive and collaborative game play. The dedicated game servers are connected to a core support network that has commonly used computer resources. The communication link between the gaming terminals and servers are supported by a communication server with message directing software that allows events that occur at individual gaming terminals to be broadcast to all other gaming terminals and servers associated with that shared gaming events.

18 Claims, 9 Drawing Sheets

U.S. PATENT DOCUMENTS

| | | | | |
|---|---|---|---|---|
| 7,056,217 | B1 | 6/2006 | Pelkey et al. | |
| 7,062,556 | B1 * | 6/2006 | Chen et al. | 709/226 |
| 2003/0027625 | A1 * | 2/2003 | Rowe | 463/20 |
| 2003/0171149 | A1 * | 9/2003 | Rothschild | 463/42 |
| 2003/0212818 | A1 | 11/2003 | Klein et al. | |
| 2003/0232650 | A1 * | 12/2003 | Beatty | 463/42 |
| 2004/0002385 | A1 * | 1/2004 | Nguyen | 463/42 |
| 2004/0048669 | A1 * | 3/2004 | Rowe | 463/42 |
| 2004/0152511 | A1 * | 8/2004 | Nicely et al. | 463/27 |
| 2004/0162144 | A1 * | 8/2004 | Loose et al. | 463/42 |
| 2004/0185936 | A1 * | 9/2004 | Block et al. | 463/42 |
| 2004/0229699 | A1 * | 11/2004 | Gentles et al. | 463/42 |
| 2004/0259640 | A1 * | 12/2004 | Gentles et al. | 463/42 |
| 2004/0266532 | A1 * | 12/2004 | Blackburn et al. | 463/42 |
| 2005/0009541 | A1 | 1/2005 | Ye | |
| 2005/0037837 | A1 * | 2/2005 | Rowe | 463/25 |
| 2005/0192099 | A1 | 9/2005 | Nguyen et al. | |
| 2005/0283522 | A1 | 12/2005 | Parkkinen et al. | |
| 2006/0073887 | A1 * | 4/2006 | Nguyen et al. | 463/27 |
| 2006/0142086 | A1 * | 6/2006 | Blackburn et al. | 463/42 |

FOREIGN PATENT DOCUMENTS

| | | |
|---|---|---|
| WO | WO-2007092608 A3 | 8/2007 |

OTHER PUBLICATIONS

"U.S. Appl. No. 10/629,110 Response filed Jul. 24, 2007 to Non Final Office Action mailed Jan. 24, 2007", 11 pgs.
"Final Office Action Mailed Sep. 20, 2007 in U.S. Appl. No. 10/629,110", FOAR,10 pgs.
"U.S. Appl. No. 10/629,110 response to Final Office Action received Sep. 20, 2007.", 11 pgs.
"U.S. Appl. No. 10/802,537 Non-Final Office Action mailed May 23, 2008", OARN,33 pgs.
"U.S. Appl. No. 10/629,110, Non-Final Office Action mailed Jun. 3, 2008", OARN,12 pgs.
Sabbouh, M. , et al., "World Wide Web Consortium", *Workshop on Web Services,* (Apr. 2001), 3.
"U.S. Appl. No. 10/629,110 Response filed Nov. 3, 2008 to Non Final Office Action mailed Jun. 3, 2008", 10 pgs.
"U.S. Appl. No. 10/629,110 Response filed Mar. 2, 2009 to Final Office Action mailed Dec. 30, 2008", 22 pgs.
"U.S. Appl. No. 10/629,110 Final Office Action mailed Dec. 30, 2008", 14 pgs.
"U.S. Appl. No. 10/802,537 Response filed Oct. 23, 2008 to Non Final Office Action mailed May 23, 2008", 12 pgs.
"U.S. Appl. No. 10/802,537 Final Office Action mailed Feb. 5, 2009", 24 pgs.
"International Application Serial No. PCT/US07/03536 International Search Report mailed Nov. 19, 2007", 2 pgs.
"International Application Serial No. PCT/US07/03536 Written Opinion mailed Nov. 19, 2007", 6 pgs.
"Web Services Architecture", *W3C Working Draft,* (Nov. 14, 2002), 1-78 pgs.
"U.S. Appl. No. 10/629,110, Advisory Action mailed Mar. 11, 2009", 3 pgs.
"U.S. Appl. No. 10/629,110, Appeal Brief filed Jun. 1, 2009", 30 pgs.
"U.S. Appl. No. 10/629,110, Examiner Interview Summary mailed Oct. 24, 2008", 2 pgs.
"U.S. Appl. No. 10/629,110, Response filed Mar. 30, 2009 to Advisory Action mailed Mar. 11, 2009", 1 pg.
"U.S. Appl. No. 11/275,323, Non-Final Office Action mailed Jun. 24, 2009", 15 pgs.
"U.S. Appl. No. 11/275,323, Response filed Nov. 24, 2009 to Non Final Office Action mailed Jun. 24, 2009", 10 pgs.
"U.S. Appl. No. 12/278,842, Preliminary Amendment filed Aug. 8, 2008", 3 pgs.
"U.S. Appl. No. 10/802,537, Examiner Interview Summary mailed Oct. 24, 2008", 4 pgs.

* cited by examiner

METHOD AND APPARATUS FOR A GAMING NETWORK ARCHITECTURE

RELATED APPLICATION

This application claims priority under 35 U.S.C. 119(e) from U.S. Provisional Application Ser. No. 60/575,796, filed Jun. 2, 2004, the contents of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2004, WMS Gaming, Inc. All Rights Reserved.

FIELD OF THE INVENTION

Embodiments of the invention described herein relate generally to gaming networks and, more particularly, to a progressive gaming system to manage and control the award of a progressive prize available to a plurality of gaming terminals. Invention embodiments also relate to a gaming system network that allows players to participate in a shared game.

BACKGROUND OF THE INVENTION

Gambling has become an increasingly important and popular form of entertainment. Electronic gaming terminals are particularly important to the gaming industry as a variety of game formats can easily be produced that appeal to a broad spectrum of players. Electronic gaming terminals may include reel type slot machines, video slot machines, video poker machines, video keno machines, and video bingo machines.

Originally, gaming machines were provided as stand alone devices that operated independently. Today, most gaming machines are networked together in a local area network (LAN). These LANs are comprised of a bank of gaming terminals connected to a carousel controller. The carousel controller is in turn connected to a site controller that aggregates data collected from each gaming terminal. Typically, these networks have only allowed gaming establishments to track accounting and player data associated with game play.

More advanced networks have been created that allow gaming establishments to create what the industry refers to as wide area progressive games. A wide area progressive system (WAP) enables multiple gaming terminals at multiple locations in a wide geographic area to contribute and compete for one or more system-wide jackpots.

In addition to collecting wagering information from each participating gaming terminal, the progressive system also collects a variety of accounting data (e.g., life to date coin in information and other accounting data provided on meters in the gaming terminal) and event data. Event data may include jackpot winning events, open gaming terminal doors, and any other significant hardware or game related events.

The WAP uses this wagering information to determine the value of the progressive jackpot. Each time a gaming terminal accepts a wager, a part of the wager is apportioned to the progressive jackpot. Many gaming terminals can be connected to a WAP and the progressive jackpot can quickly increase to a significant level. These large jackpots are particularly appealing to many players and progressive games have become quite popular.

As the number of gaming terminals participating in a progressive increase, the jackpots become commensurately larger and increase at a faster rate. Game establishments often try to include as many gaming terminals as possible in a progressive game to provide ever increasingly larger jackpots. A number of gaming establishments can be linked together to participate in a single progressive game. Each participating casino's LAN is linked to a central system that provides a wide area progressive (WAP) game to multiple sites. With the wide area network, many more gaming terminals can be linked together into a single progressive game, allowing substantial jackpots to quickly accumulate.

These WAP systems have exponentially increased the difficulties associated with the data transmission and data management required to satisfactorily run a progressive game that may extend over a vast geographical area and between a number of different commercial entities. The larger number of geographically diverse gaming terminals participating in a single progressive game is only one factor increasing the complexity of maintaining and running a stable progressive gaming system.

For example, originally, only a single progressive game was offered at a gaming terminal. Today, a single gaming terminal may participate in several different progressives. These progressives may be local progressives (for a specific individual casino) or may extend between several different gaming sites. In addition, progressives have been suggested that include nontraditional progressives that accumulate jackpot prizes based on a variety of schemes and are triggered by a number of different methods.

The complexity of providing a myriad of different progressive games at different geographic levels and among different participating commercial entities creates a logistical challenge for the coordination of communications necessary to ensure a functionally stable progressive computer network. The challenges associated with communications between complex progressive games demand a solution that addresses the interrelationships between hardware and software. A communications system is needed that can quickly and efficiently process the intensive data communications generated by such large and complex systems.

The increasing complexity of the progressive games themselves, because of the addition of new features and capabilities to the gaming terminals, adds further challenges to any progressive system. The software used on these systems typically requires upgrading to accommodate the additional requirements imposed by these changes. The progressive system must be designed to incorporate these software upgrades without adversely affecting the operability of the progressive's communication network. The safest and easiest methodology for providing software upgrades is to segregate the communications system of the progressive computer network from the game software, whether it is a progressive or any other type of shared game.

What is needed is a networked gaming system that can handle the intensive data communication systems necessary to allow players to participate in a shared gaming experience, such as a progressive game, along with the capability to efficiently modify the shared gaming experience to accommodate new types of games and ensure a stable operating platform without affecting the networks communications systems.

SUMMARY OF THE INVENTION

Embodiments of the invention described herein include a progressive gaming network that uses unique system architecture to ensure the stable and efficient routing of data communications in a progressive gaming system. This progressive gaming network uses a combination of both SQL server technology and message directing software to provide data communications throughout a gaming system computer network with dedicated game servers that provide a shared gaming experience such as a progressive wagering game.

The progressive gaming network is composed of dedicated progressive servers communicating with a plurality of gaming terminals through a core support network. The support network provides basic computing services to each of the separate progressive servers. The core support network includes at least a communications server to route communications between gaming terminals and the appropriate game server. The core support network may also include a database server, and a directory server, a standby server, and a backup server in any combination. The concept behind the core support network is to minimize duplication of computer services while simultaneously segregating the function of communications from the game application function of the central system network. Each progressive server is dedicated to a single game. Individual progressive servers can be added to the system as necessary to expand the number of progressive games offered. The failure of any single progressive game server 40 does not affect the system and performance of any other progressive game on the system. Consequently, the progressive/shared gaming network is extremely reliable and easily expandable.

Each of the progressive servers is linked to the core support network, and consequently to each of the gaming terminals, using both the message directing software and Microsoft SQL Server technology. The support network includes a communications server that routes event messages between gaming terminals and the appropriate progressive server. The communications server uses message directing software to ensure the efficient and timely routing of data transmissions from the lowest levels of the progressive gaming network (i.e., gaming terminals) to the highest level components (i.e., progressive gaming server), and all intermediary components, ancillary devices, and separate and distinct application programs within each of these devices.

In addition to the Message Director software, a Microsoft SQL server application is used to update databases residing on various servers in the progressive system. The SQL server application updates the databases on all servers simultaneously to ensure that each server is operating with the same data set. The combination of the SQL server application and event messaging ensures a stable operating environment for the progressive game, through the timely and reliable recordation of transactions.

The independent nature of each dedicated progressive game server simplifies the addition and deletion of progressive games from the system and upgrading game program software for each particular progressive game. This methodology allows the expansion of a progressive gaming network without affecting the software or the stability of the existing progressive games. Otherwise, the progressive gaming network might have to be taken off-line to effect the necessary software programming changes to allow the addition of new progressive games to the network. The plurality of dedicated progressive servers ensures that no single failure will completely disable the system. A single failure in the dedicated server only removes that specific progressive game from service (although a backup server may be available to take over for a failed server). Progressive servers are independent and can function regardless of the status of the other progressive servers in the network.

Although the discussion above was limited to progressive games, the network architecture used in this gaming system can also be applied to any shared gaming experience. The progressive servers discussed are simply specific functional descriptions of the game server 40 that can be used to provide game applications that involve a shared game. The progressive system discussed is also a specific functional description of a shared gaming system. This shared gaming experience may include competitive and collaborative type gaming. For example, a single central server may be dedicated to providing a shared game that allows players on gaming terminals linked to that central server to compete among themselves. Not only can be shared game be competitive it may also be collaborative in that players may work together to produce a winning game outcome.

In summary, the progressive system architecture uses a communications system that combines an SQL server and a message queuing software program to establish a communications architecture that allows data transfer between different network components and software applications. This communication architecture ensures the timely delivery of data to allow the stable operation of the progressive system. Furthermore, this communications system provides for a scalable network that allows the introduction of additional progressive servers at any time without disruption to the other progressives already installed. The independence of the each progressive server also ensures that any problems are limited to that game. The combination of message queuing and SQL server programs ensures data is sent to the correct hardware and application to update data and perform the functional requirements of each of the hardware devices as directed by the progressive game software.

The system architecture described above with its linked database servers provides more efficient storage, communications, replication of shared data, and bandwidth management. In addition, transactions can be made without a third-party transaction manager. As a result, communications overall are vastly improved allowing for redundancy and the efficient exchange of data within progressive games while separately controlling independent progressive games.

BRIEF DESCRIPTION OF THE DRAWINGS

The foregoing and other advantages of the invention will become apparent upon reading the following detailed description and upon reference to the drawings in which.

Figure 1:
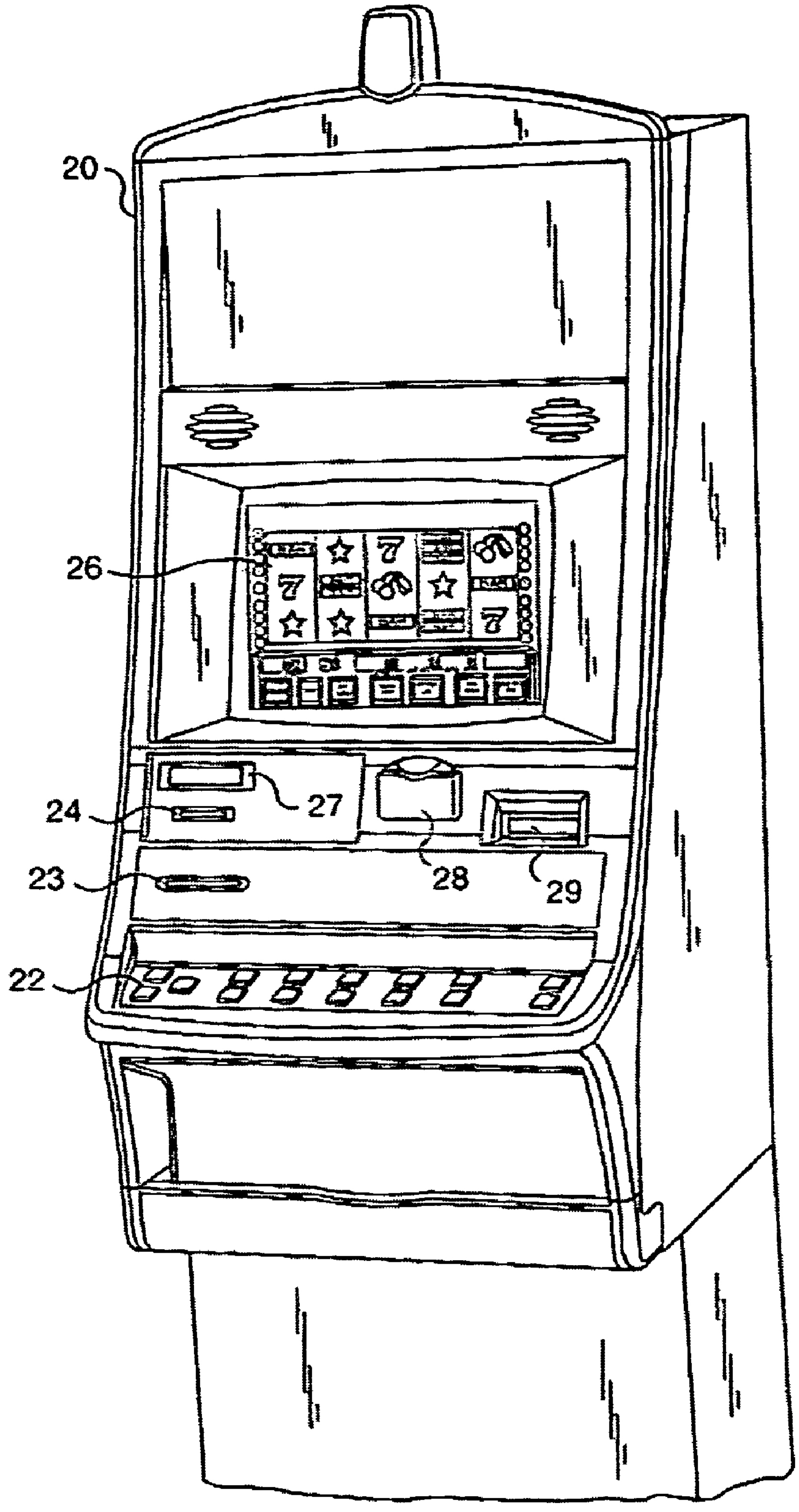
FIG. 1 is a perspective view of a gaming terminal.

While embodiments of the invention are susceptible to various modifications and alternative forms, specific embodiments have been shown by way of example in the drawings and will be described in detail herein. It should be understood, however, that the invention is not intended to be limited to the particular forms shown. The invention is to cover all modifications, equivalents, and alternatives falling within the spirit and scope of the invention as defined by the appended claims.

DETAILED DESCRIPTION

The description of the examples is to be construed as exemplary only and does not describe every possible embodiment of the invention. Many alternative embodiments could be implemented, using either current technology or technology developed after the filing date of this patent, which would still fall within the scope of the claims defining the invention.

FIG. 1 shows a perspective view of a typical gaming terminal 20 used in the networked gaming system. The gaming terminal 20 may have varying structures and methods of operation. For example, the gaming terminal 20 may be an electromechanical gaming terminal configured to play mechanical slots, or it may be an electronic gaming terminal 20 configured to play a video casino game such as blackjack, slots, keno, bingo, poker, etc. Typical components found in a gaming terminal 20 are described below. It should be understood that numerous other elements may exist and may be used in any number of combinations to create a variety of gaming terminal types.

The game itself is displayed to the player on a visual display 26, such as a video display. The video display 26 may take the form of a cathode ray tube (CRT), a high resolution LCD, a plasma display, LED, or any other type of video display suitable for use in a gaming terminal. Instead of a video display 26, the gaming terminal 20 may have several mechanical reels to display the game outcome.

The visual display 26 may include a touch screen 21 overlaying the display to allow players to make game related selections. A push button panel 22 is also typically offered, in addition to the touch screen 21, to give players an alternative method for making gaming selections.

A wager acceptor 16 may include a coin slot acceptor 28 or a bill validator 29 to enter monetary value to the gaming terminal 20. The gaming terminal 20 may also have a ticket printer 23 that may print and/or read or otherwise encode ticket vouchers with a monetary value. The encoded ticket voucher may also have the casino name, type of voucher, validation number, and a bar code with control and/or security data.

Many gaming terminals 20 are also equipped with a player tracking card reader 24. A player may be enrolled in the gaming establishment's player club and may be awarded certain complimentary offers as that player collects points on his player tracking account. The player inserts the player-tracking card into the reader, allowing the gaming establishment's player tracking server to record the player's wagering activity. The gaming terminal 20 may also include a player tracking display 27 to be used with the player-tracking card and card reader 24.

Figure 2:
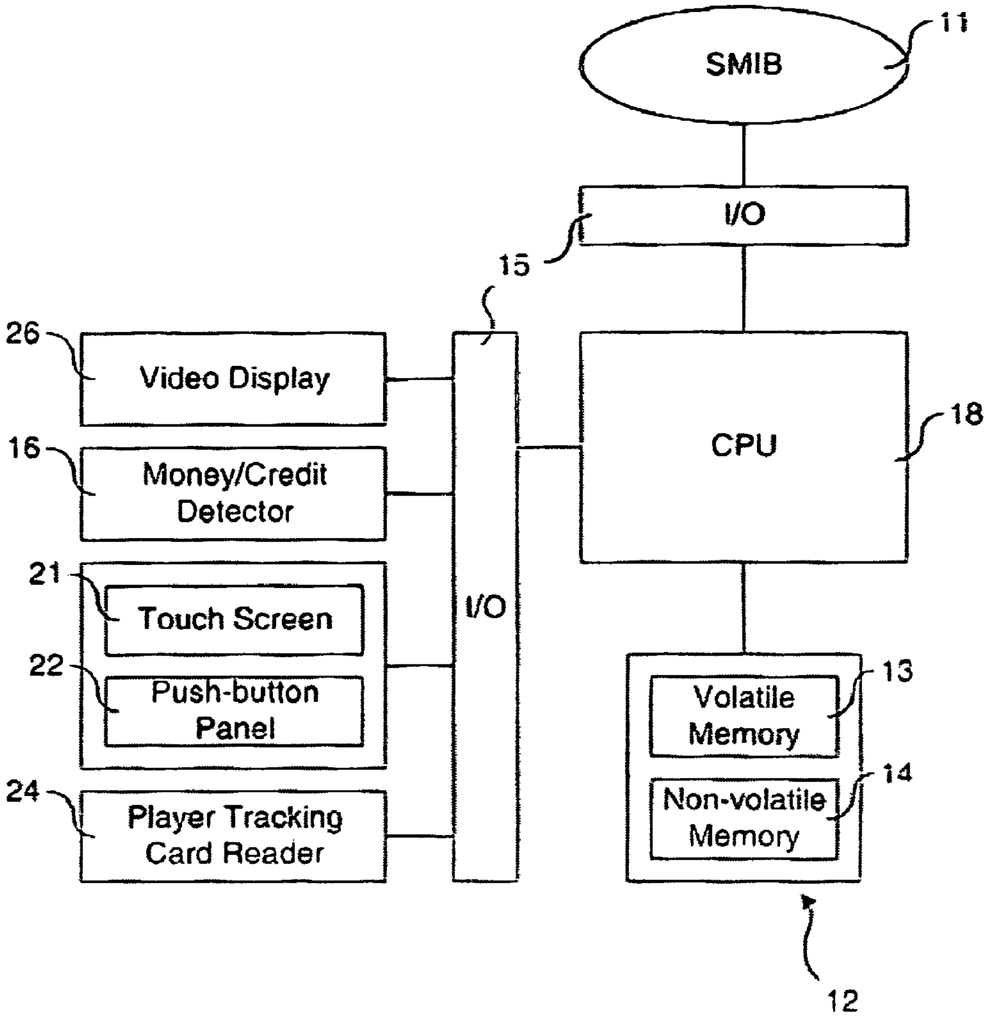
FIG. 2 is a block diagram of the electronic components typically used in the gaming terminal of FIG. 1.

The gaming terminal 20 is controlled by a central processing unit (CPU) 18, as shown in FIG. 2. The CPU 18 controls the gaming terminal's peripheral devices. These peripheral devices may include a touch screen 21, a push button panel 22, a player tracking card reader 24, a video display 26, etc. (as discussed above). The number and the type of peripheral devices may be different from those depicted in FIG. 2 depending on the desired configuration of the gaming terminal.

The CPU 18 also executes the game program to give the player winning and losing game outcomes. The CPU 18 uses a random number generator with a probability table to select a random game outcome. This game outcome corresponds to a particular set of reel stop positions in the slot type gaming machine. The CPU 18 may also generate a random number that provides a winning progressive jackpot outcome.

The CPU 18 controls the peripheral devices and the execution of the game program using system memory 12, which includes a volatile memory 13 (e.g., a random access memory (RAM)), a non-volatile memory 14 (such as an EEPROM), and an input/output (I/O) circuit 15. Although only one microprocessor is shown, the central processing unit 18 may include multiple microprocessors. Similarly, the system memory 12 of the central processing unit may include multiple RAM and multiple program memories.

Figure 3:
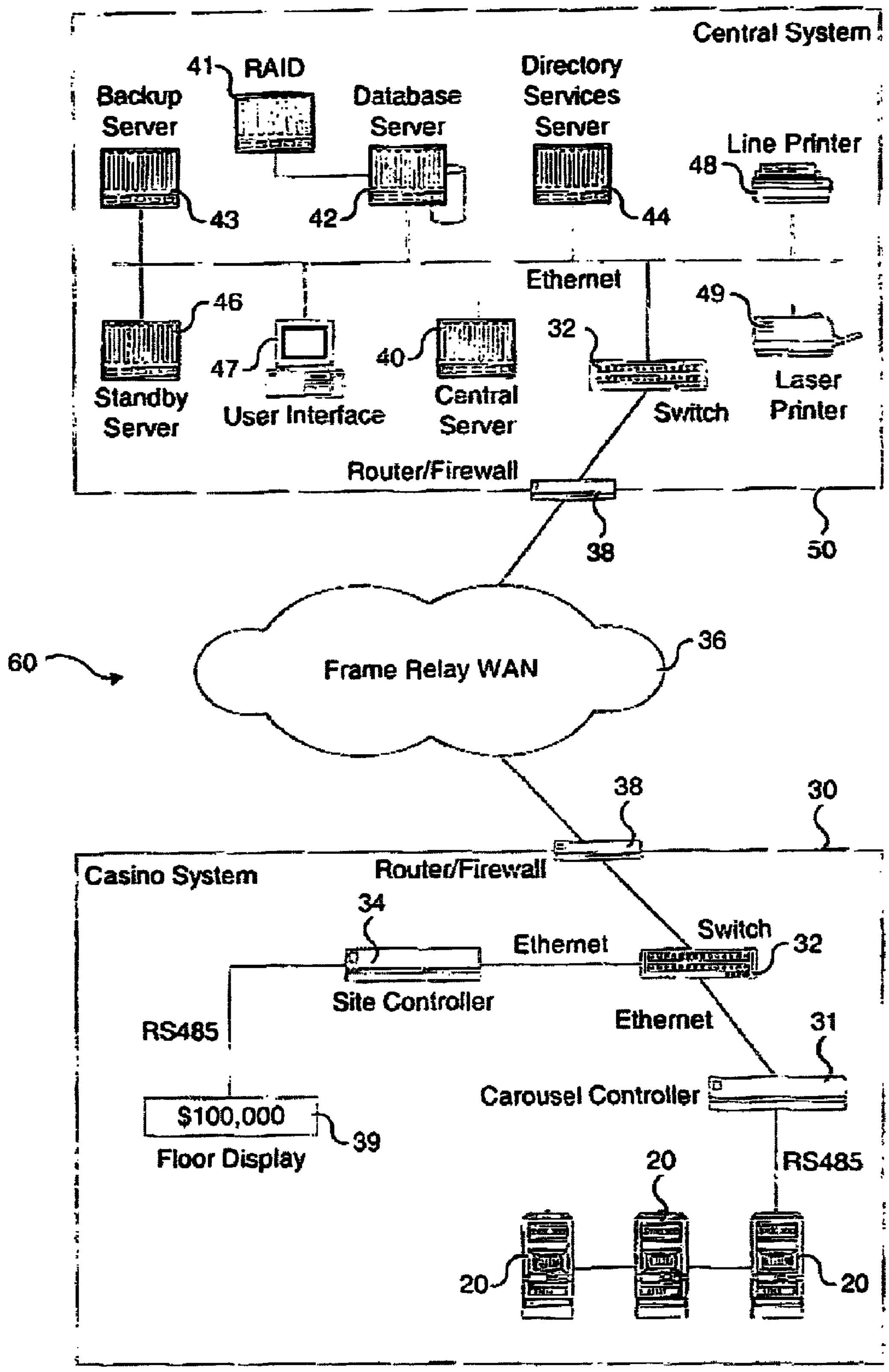
FIG. 3 is a diagram of a wide area progressive gaming system with a single game server.

Turning to FIG. 3, the wide area progressive system 60 links gaming terminals 20 from a number of gaming establishments from different geographical locations together to a central site network 50. Several logical components are required to functionally complete the WAP system shown in FIG. 3. The hardware for the wide area progressive system may be separated into three distinct categories: 1) a local area network (LAN) 30 to link the gaming terminals 20 together at the local gaming site and aggregate data as needed, 2) a central site network (CSN) 50 to coordinate hardware to receive data from each LAN, and 3) a wide area network (WAN) 36 to link the LAN with the central site.

In the LAN 30, each participating gaming terminal 20 in the progressive game is linked in the network to a carousel controller 31 in the gaming establishment. The carousel controller 31 is in serial communication with each gaming terminal 20 and an overhead display 39. The overhead display 39 shows the current progressive jackpot amount. The carousel controller 31 communicates with the gaming terminals 20 and the overhead display 39 via a polled RS485 connection. The carousel controller 31 polls each gaming terminal 20 at regular intervals and receives data from each gaming terminal in response to the query. In one embodiment, although the carousel controller 31 can request data from the gaming terminal 20, no hardware device or software application can affect any game outcome on any of the progressive gaming terminals; only the gaming terminal 20 determines the game outcome and the winner of a jackpot progressive. In another embodiment, the gaming terminals may be dumb terminals with the entire game play activity being coordinated and controlled by a game server.

In addition to the carousel controller 31, most gaming establishments also have a site controller 34 that links a number of carousel controllers 31 together at a single gaming site. The carousel controller 31 is connected via an Ethernet TCP/IP interface to a site controller 34. The carousel controller 34 translates gaming terminal 20 data from a poll driven proprietary gaming device protocol (understood by gaming devices) to the event driven XML protocol used upstream from the carousel controller to provide a focal point for the aggregation of data produced from the gaming terminals.

In addition to the gaming device 20, carousel controller 31, and the site controller 34, the casino LAN 30 also contains a switch 32 and a router 38 to enable communications between these devices and WAN 36. Within each casino, these devices communicate via an Ethernet connection. The site controller 34 links to a standard network router 38 that transmits data to a standard network router at the central system 50. Routers 38 at many different casino sites may link with the central system router to enable gaming establishments in different physical locations to participate in a single progressive.

The central system network 50 and the casino LAN 30 have a router 38 and a switch 32 to connect each of the independent hardware devices in their respective networks. Routers 38 are used for data transmission between remote networks (i.e., the casinos and the central site). The router 38 is equipped with private frame-relay connections, ISDN connections, and analog calls. The switch provides a common connection point between devices on each network. The associated equipment components of the central site network 50 and LAN communicate via TCP/IP using a standard RJ-45 Ethernet cable. The WAP System 60 uses a private frame relay WAN 36 connection with Internet Protocol Security, (an internationally recognized security standard), between locations.

The central site network 50 as shown in FIG. 3 includes two primary servers: a middle tier application server or game server 40 and a database server 42, and 3 secondary servers: a directory services server 44, a backup server 43, and a standby server 46. The CSN 50 shown in FIG. 3 supports a single progressive game. The directory services server (directory server) 44 provides standard directory services such as Active Directory services, Domain Name Services (DNS), and Dynamic Host Configuration Protocol (DHCP). The backup server 43 is used to create daily archives, such as on magnetic tape, which may be used to restore the system in the event of failure or disaster. The standby server 46 is included in the system in case of server failure. The standby server 46 is not used in the normal operation of the WAP system; instead, it is a backup server held in reserve and is hot swappable for use in case of a failure of any of the primary or secondary servers.

A user interface computer (user interface) 47 is provided to interface between the servers and printers (a line printer 48 and a laser printer 49). The user interface computers 47 and the printers 48, 49 enable the central system operators to monitor the gaming WAP network. One user interface computer 47 is dedicated to monitoring the central system network 50 and each gaming device 20 participating in the progressive. A second user interface computer 47 is dedicated to updating the progressive system, to monitor and configure the progressive gaming system, and in particular to add new gaming terminals 20 to the progressive.

Figure 4:
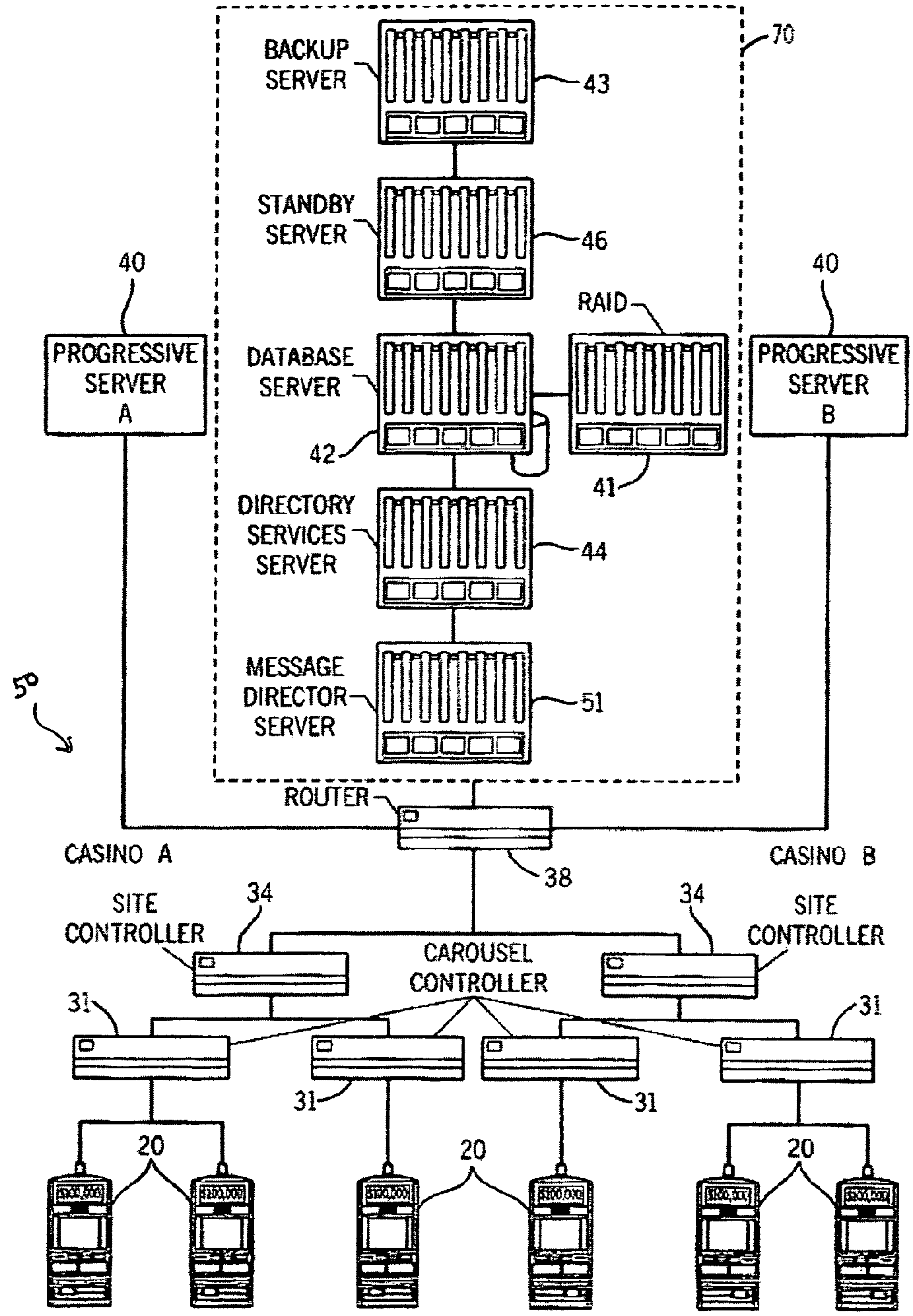
FIG. 4 is wide area progressive gaming system with multiple game servers.

The central system architecture shown in FIG. 3 may be modified to allow an easily scalable system that only requires the addition of a server to add a progressive game. This system architecture is shown in FIG. 3 and depicted with a single progressive game server 40. This architecture can be readily expanded to accommodate any number of progressive servers as shown in FIG. 4. Multiple progressive games are shown in FIG. 4, each independently supported with its own dedicated game server 40. The directory server 44, backup server 43, and standby server 46 operate in common as a support network to support each of the individual progressive game servers 40. The support network may be less than all of these components and may only include the directory server 44.

Figure 8:
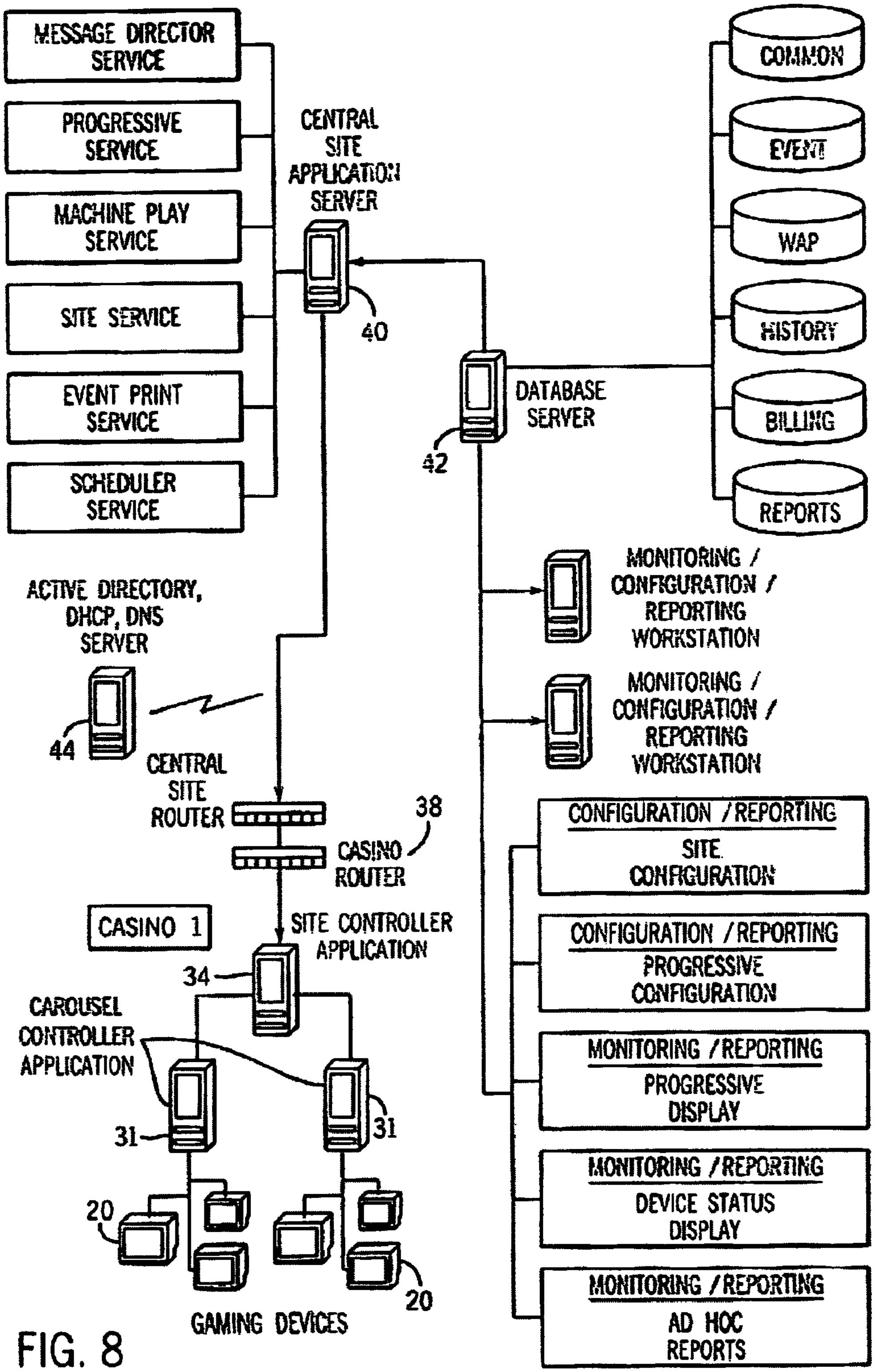
FIG. 8 is a second embodiment of a gaming system computer network with a single game server.

In the simplified single progressive server central system shown in FIG. 3, the WAP central system software uses the game server 40 to process transactions specific to a particular progressive game and the database server for recording data to storage. The same game server 40 may also be used to operate the applications that control communications among all the gaming terminals 20 in the WAP 60. The directory server 44 is the Microsoft domain controller and active turnkey server for the physically separate WAN network. FIG. 8 is an alternate system architecture embodiment of the single game server 40.

Figure 9:
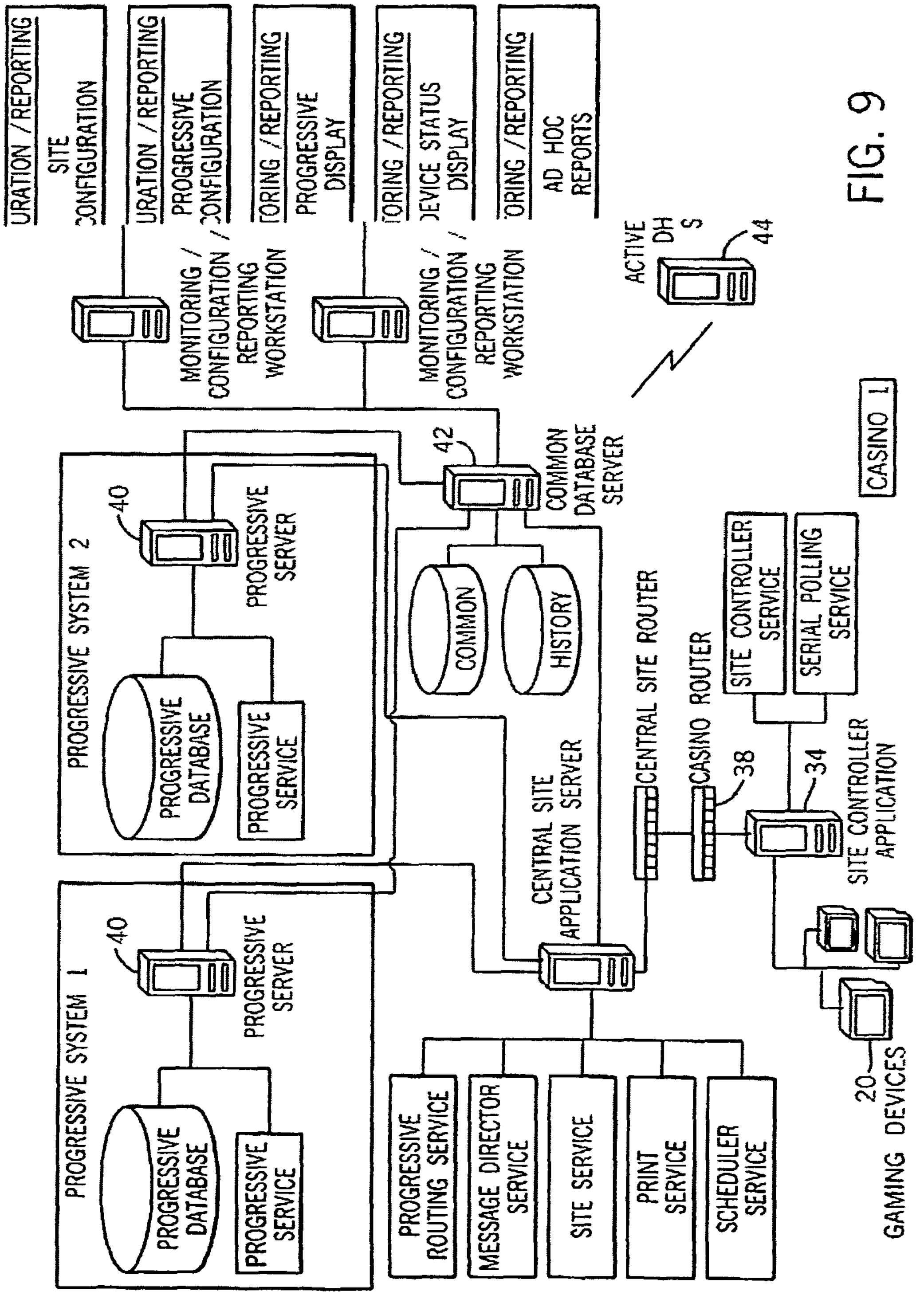
FIG. 9 is a third embodiment of a gaming system network with multiple dedicated game servers supported by a support network.

A similar approach is taken for the central system network shown in FIG. 4. The major difference is that the progressive game servers 40 are supported by a core support network that includes a message director server 51 that provides communications from the gaming terminal to the appropriate game server 40 (either progressive server A or progressive server B as shown in FIG. 4) and the database server 42 and directory server 44 as needed. This separation of the communications functions and game application functions of the central system network 50 allow the system to be flexibly expanded and updated without affecting the communications system developed for the system architecture shown in FIG. 4. FIG. 9 shows an alternate embodiment of a computer system architecture using multiple game servers dedicated to separate shared games.

Although the computer system architectures shown in FIG. 3, 4, 8, 9 generally refer to progressive game servers, embodiments of the invention are not limited to progressive type games. In fact, the system architectures discussed may be used in any shared game. A shared game is any game in which players participate on a competitive basis, a collaborative basis, or in both a competitive and a collaborative basis with other players. An example of a shared game includes a networked gaming system comprising a plurality of gaming servers, with each gaming server dedicated to one of a plurality of shared games. The plurality of servers may include a first and second server to provide competitive game play between the first and second server. Players on gaming terminals connected to the same server may play collaboratively. In another example, players on gaming terminals connected to the same server may play competitively. A progressive game is merely one specific type of shared game. In a progressive game, one aspect of the shared gaming experience is the ability to compete for the progressive jackpot.

In all of the system architecture networks, system communication is events driven in the sense that each time an event occurs in the gaming terminal 20, the device sends this information to the central system. The gaming terminal 20 data is communicated from the gaming terminal to the carousel controller 31, to the site controller 34, and to the progressive game server 40 for processing and ultimately to the central system database 42 for storage. Just as importantly, the central system progressive game server 40 communicates with the database server 42 to provide progressive data to the gaming terminals 20 through the site controller 34 and carousel controller 31 for display on the overhead display 39 and game meters.

The hardware components of the WAP must exchange data in a matter that ensures that all gaming terminals 20 are operating with the same data parameters, despite their physical separation. To ensure the data integrity of the system, the WAP system uses a number of software applications so that the communication of data throughout the WAP is timely and accurate.

The gaming terminal 20 and carousel controller 31 communicates using a master-slave serial protocol in a polled environment. The gaming device can only send data to the carousel controller in response to a poll of the carousel controller. The carousel controller 31 polls every gaming terminal 20 on a continuous loop. Each time a gaming terminal 20 is polled, the device responds with either a new activity response, or a specific response for events that occurred at the gaming device. If the carousel controller 31 does not poll the gaming terminal 20 within 15 seconds, the gaming terminal automatically disables itself from play and displays "game disabled" on the credit meter of the gaming device. Any loss of communications between the gaming terminal 20 and carousel controller 31 are reported to the central system monitor through the user interface line printer 48 and user interface device monitoring application.

All other devices in the wide area progressive—besides the gaming terminal 20 and the carousel controller 31—use XML over TCP/IP to communicate. The carousel controller 31 and site controller 34 are connected over a physically separate Ethernet LAN using TCP/IP.

The site controller 34 and the central system network 50 are connected over a private separate WAN. The message director server 51 is used with message queuing software to communicate event messages between the LAN 30 and the central system network 50. The combination of the message director server 51 and message queuing provides a highly reliable methodology for forwarding and guaranteeing receipt of all messages between these devices.

The progressive game server 40 communicates with the database server 42 using database stored procedure calls. These communications could also be performed using message director software instead of remote procedure calls. The database server 42 and the progressive game server 40 communicate over the central system network 50.

Figure 5:
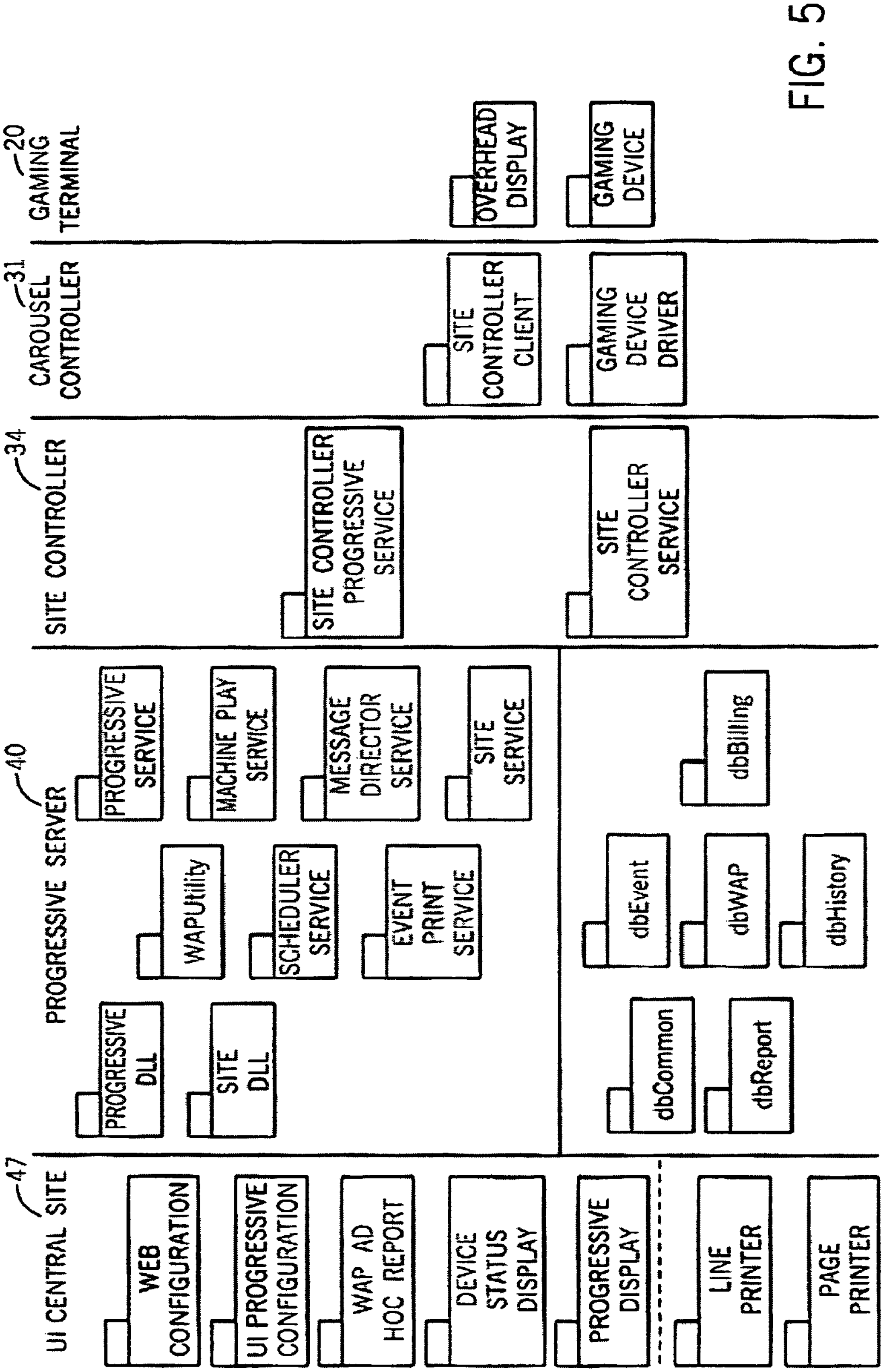
FIG. 5 is a typical wide area progressive software application package.

The hardware described above, both for the WAN and the LAN, uses application software programs to fulfill their function. The central system software can be categorized as: user interface, middle tier processing, or database services. The local area network software is used to aggregate casino data, aggregate carousel data, or control data communication between the gaming device and the carousel controller. FIG. 5 provides a diagram of these application software packages and their communication links between the hardware components described in shown in FIG. 4.

Game Server Related Software for Central Services

Figure 6:
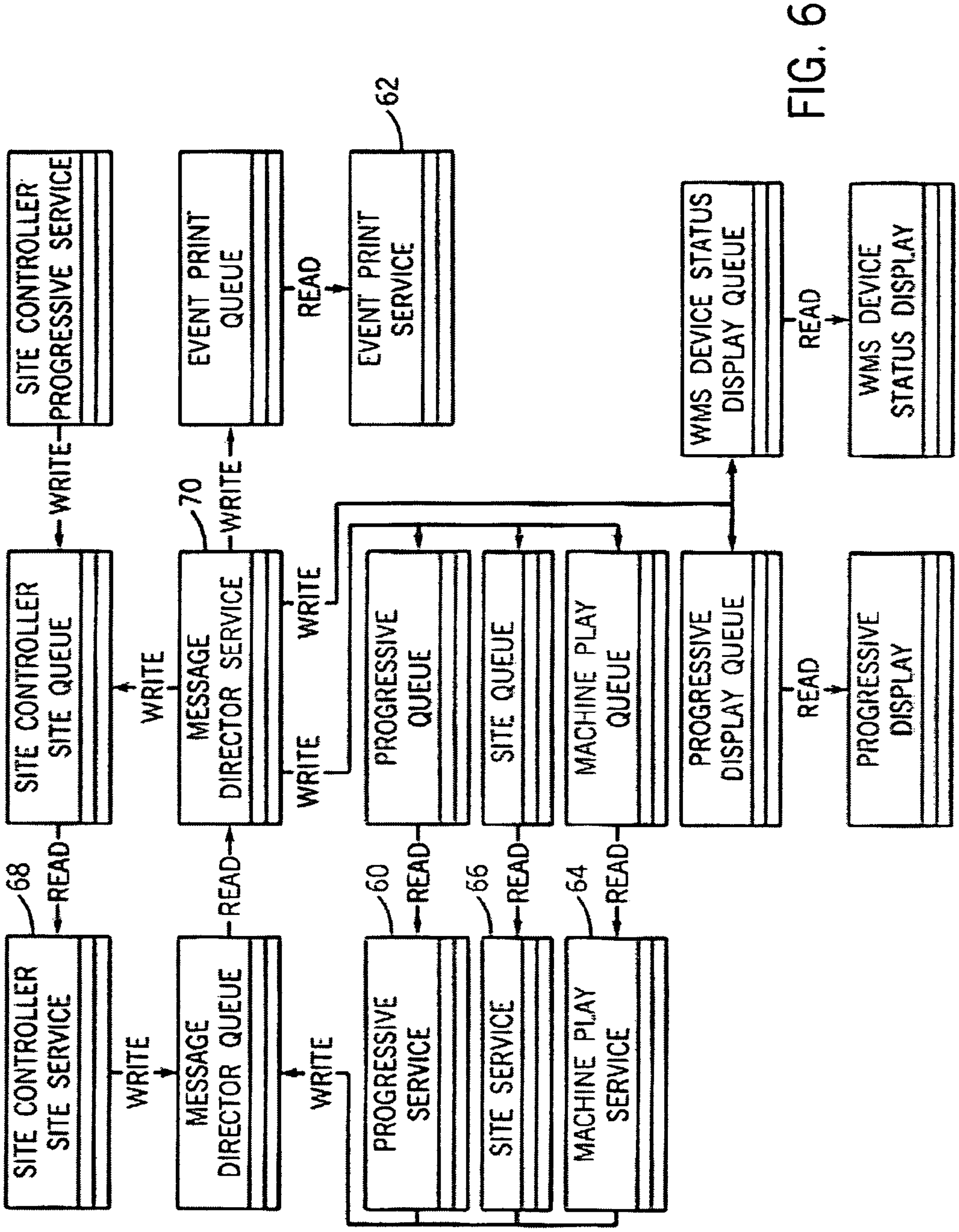
FIG. 6 is a flow chart of the applications used in a typical progressive gaming system and their associated message queues.

The middle tier services applications run continuously on game server 40. Some of these applications are shown in FIG. 6. These applications provide business rule processing and control communication between devices. Services include: the progressive service 60, the machine play service 64, the message director service 70, the site service 68, the event print service 62, and the scheduler service.

The progressive service 60 is an executable that runs as a WINDOWS Service. Progressive service 60 reads from a message queue to send out the periodic progressive amount messages and progressive won messages from the casino.

The machine play service 64 is an executable that runs as a WINDOWS service. The machine play service 64 reads from a message queue to receive and process machine plays from the gaming devices.

The message director service 70 is an executable that runs as a WINDOWS Service. Message director service reads from a message queue to receive messages from site controllers and central system services and routes them to their target applications.

The site service 66 reads from an MSMQ queue to receive messages. The site service 66 is responsible for: routing messages from the central system services to the site controllers 34, initiating the meter request message, reporting gaming device exceptions, monitoring communication for all devices, reporting configuration data, reporting meters messages, and reporting error messages.

The scheduler service is an executable that runs as a WINDOWS service. The scheduler service reads from an MSMQ to receive messages. The scheduler service is responsible for printing periodic reports such as the hourly status and end of day reports.

The event print service 62 is an executable that runs as a WINDOWS Service. Event print service reads from an MSMQ to receive messages. Event print receives messages that tell it to print a page report or to print a message to the line printer.

Dynamic Link Libraries

Dynamic link libraries (DLL) are used extensively within the system to facilitate and simplify functions common to a number of applications. The use of the dynamic link libraries simplifies programming and facilitates software modifications. Among the dynamic link libraries are the progressive dynamic link library and the site dynamic link library.

The progressive dynamic link library (DLL) is a WINDOWS DLL that contains a variety of classes to support database calls for progressive components. The classes are progressive, jackpot, prize, and the classes used to support the configuration of games to a progressive. The main messages supported by the DLL are: progressive won (ProgWon), machine play (MachPlay), and progressive amount (ProgAmt). The main processes supported by the DLL are: update, insert, delete, and progressive unit load.

The site dynamic link library (DLL) contains a variety of classes to support database calls for physical components related to the wide area progressive system. The classes are site, site controller, carousel controller, gaming device, game, overhead display, and supporting classes. The main messages supported by the DLL are: game meter (GameMeter) exceptions, lost, resume; COM messages for carousel controller, site controller, gaming device, overhead display; error messages for carousel controller, site controller, gaming device, overhead display; configuration messages for the site controller, carousel controller and gaming device.

The WAP utility is a WINDOWS DLL that provides common functions across applications. Some functionality it provides includes: access to the MS SQL server database, a centralized form to display error messages to user interface apps, trace logging, access to the WINDOWS event log, and access to the WINDOWS registry.

Database Server Related Software

The database server operates MICROSOFT SQL SERVER and stores all system data to the attached RAID Network Storage device. Data is processed and stored using business rules in the SQL stored procedures. The WAP SQL databases are divided into three categories: common, application, and utility. Databases associated with each game server 40 (and the shared game running on that server) are also archived on the database server 42 (and it's associated Network Storage device). The archived databases are automatically updated by the MICROSOFT SQL SERVER program whenever the database on the game server 40 changes.

Common database tables are entities that are predominantly static in nature. The common database, (dbCommon), contains information relating to the physical entities of the system such as the gaming devices in casinos. It also contains accumulated meter data from meters associated with the gaming device for an accounting day period. These common entities are referenced by application databases.

Application database tables are entities representing the specifics of a particular application, such as wide area progressives. Application databases are: dbEvent, dbReport, dbWap, dbBilling, dbHistory.

The event application database, for example, (dbEvent), contains the necessary event definitions to process and store individual gaming device and system-defined events, such as a gaming device door-open event.

The billing application database, (dbBilling), contains the necessary billing definitions to process invoices. At the end of each accounting period, or at other defined intervals, such as a progressive won event, data is transferred to dbHistory. These history tables are the source for the analysis service OLAP application that will summarize the data by various indicators. The report application database, (dbReport), contains the necessary report definitions to process report requests from multiple data sources.

The WAP application database, (dbWAP), contains the necessary definitions and configuration data to operate a wide area progressive system. These WAP entities are associated with the common entities. The WAP application is transactional in nature. Main objectives of this application are: calculate the progressive amount, accumulate individual gaming device, life-to-date coin-in amounts, calculate a jackpot, and begin a new jackpot session once a jackpot has been awarded.

Utility databases house functional objects and processes shared by all databases. These can be described as common run-time functions, such as converting data-types. Utility functions are contained in dbMaster that is commonly installed as part of MICROSOFT SQL SERVER installation.

User Interface Related Software

The user interface 47 at the central site allows the system operators to configure and monitor entities in the system. The User Interface Site Configuration is a WINDOWS executable that allows the central system operators to configure physical devices associated with the progressive system. This system component is made up of several user interface screens that allow: the central system operator to configure the physical devices making up the wide area progressive 60, including the site controller 34, carousel controller 31, gaming terminal 20, overhead display 39, etc.; the central system operator to edit the configuration values in tblConfig; the central system operator to view the event log and event error log; the central system operator to request meters from a gaming terminal 20 by site controller 34, carousel controller 31, gaming terminal 20.

The user interface progressive configuration is a WINDOWS executable that allows the central system operator to configure a progressive in the system. In addition to providing configuration capabilities, the user interface also has report producing capabilities. For example, the ad hoc report user interface is a WINDOWS executable that allows the central system operator to view and print various page reports. The AdHocReport.dll provides the interface to the dbReport database to populate the user interface controls with report information. The individual reports provide the definition for the reports. Reports provide summaries of device configuration, progressive prizes, and gaming device dollar accumulation and device statuses to help decision-making and performance analysis.

In addition to historical reporting, the user interface 47 also provides real-time reporting capabilities. The device status display receives periodic ping messages from services running at the central site and displays status on the user interface. It also periodically calls the database to get the status of overhead displays 39, gaming terminals 20, site controllers 34, and carousel controllers 31 and then displays the status on the user interface 47.

Part of this real-time reporting includes a progressive display that shows the current progressive amount for all open progressives. Each time a progressive is won; this display also provides a visual and audio alarm.

Information about game monitoring is printed as it occurs to the line printer 48. This information is also stored in the central system database server 42. Automatic and on-demand reports are printed to the page printer 49, a separate printer apart from the line printer 48.

Site Controller Related Software

The site controller 34 uses two executable programs that run on WINDOW services: the site controller progressive service and the site controller service. The site controller progressive service reads from the message queue to receive messages from the site controller service. The site controller progressive service provides the ability for the site controller to continue processing the progressive system at the casino level when communication is lost with the central system. For example, during a loss of communications, the site controller 34 continually updates the progressive jackpot as wagers are made on the local gaming terminals 20. The site controller 34 also updates the overhead display 39 with the current progressive amount based on the last progressive jackpot amounts before communication disruption plus all local wagers made from the time of communication disruption.

The site controller service reads from an MSMQ queue to receive messages from the central system and directs messages from the central system to the site controller progressive and/or to the carousel controller. The site controller service directs messages from the carousel controller to the site controller progressive and/or the central system network 50.

Carousel Controller Related Software

The carousel controller 31 communicates with both gaming terminals 20 and the site controller 34. The carousel controller 31 communicates with gaming terminals 20 and the overhead display 39 through the gaming device driver, (gdDriver) over a serial line. The gdDriver polls gaming devices for events and broadcasts progressive amount data to in-game meters and overhead displays.

The carousel controller 31 also communicates with the site controller 34 over a TCP/IP connection using the site controller client, (scClient). The site controller client communicates with the gaming device driver with a named pipe. The site controller client delivers events to the site controller. The site controller client delivers configurations and requests to the gaming device driver.

The central system database and central system middle tier services communicate using database-stored procedure calls. Any loss in communications between the central system database and game server 40 is reported to the central system monitors via the user interface line printer 48 and user interface device monitoring application.

Various application programs described above communicate with each other relying chiefly on the event messaging software. For example, the site controller and central system's game server 40 communicate using the XML protocol and message queuing to store and forward messages. Any loss in communications between the site controller 34 and central system game server 40 is reported to the central system monitors via the user interface line printer 48 and user interface device monitoring application.

Figure 7:
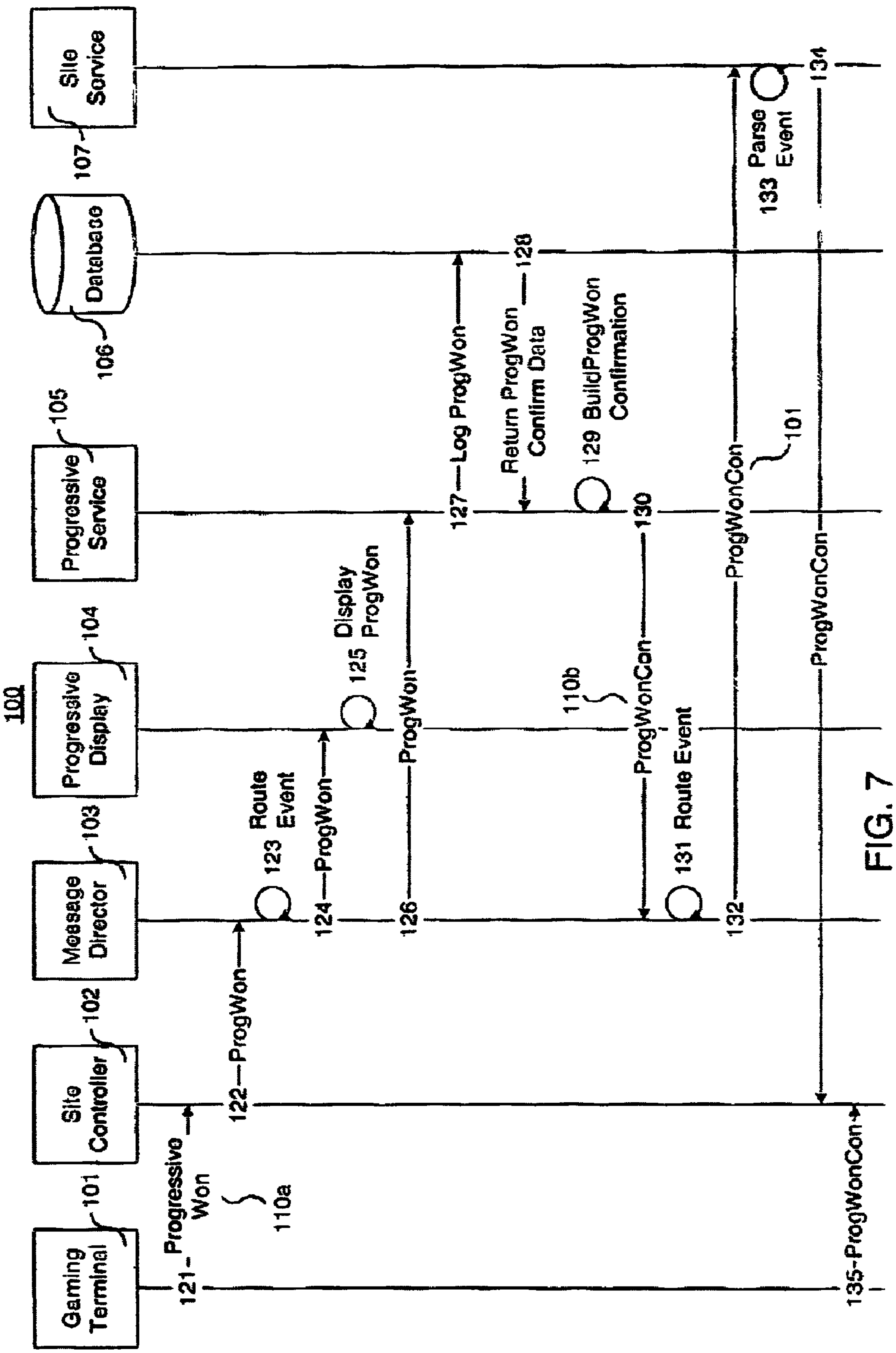
FIG. 7 is a flowchart of a progressive won event message as it is propagated through the progressive system

The flow chart shown in FIG. 7 demonstrates the flow of event messages 100 in a progressive game as a result of winning the progressive at one of the gaming terminals 20. The Progressive Won 110*a* event (winning the progressive and gaming terminal) initiates a cascade of event messages relayed up through the local area network 30 from the carousel controller or 31 to the site controller 34, to the central system network 50 and the game server 40 linked to the winning gaming terminal. A number of progressive gaming applications are contained in the game server 40 and in the central system network 50 that support the payments of the jackpot progressive to the winning player. Messages are created in each of these applications and are forwarded to other applications that reside in hardware components in the WAP 60. Although the flowchart shown in FIG. 7 does not contain any message queues for the various applications, associating a message queue with each application is possible, as shown in FIG. 6. A message queuing system is not essential for the operation of the message director, but it does allow the message director to operate more efficiently and reliably. Instead of the message queuing system, the message director could use any standard network connectivity model and any standard method of reliable message delivery.

To incorporate even more flexibility in the message director system, the event messages may be encoded using an extensible markup language (XML) schema. This simplifies the exchange of data messages among applications that may not use the same proprietary communication protocols. The XML standard is a means of exchanging data among systems where the need for interface definition is developed against a common agreed-upon schema that is readily extensible while maintaining compatibility with existing implementations. The present invention is not limited to the use of the XML language and any other appropriate language could be used.

The advantage of the XML schema is that it allows systems that use different proprietary communication standards to communicate with one another. This is a particularly important advantage for the gaming industry where many different proprietary communication protocols exist within gaming systems. Through a common XML schema, data communications between systems that use unfamiliar and foreign communication protocols can be readily translated without access to proprietary vendor communication protocols. The XML schema allows information to be transmitted to any number of otherwise incompatible software applications. In one embodiment, the XML schema is implemented in the message director system through the capture of data elements transmitted from a gaming terminal 20 to a carousel controller 31. This system typically employs a proprietary serial protocol. In turn, the carousel controller 31 is typically in serial communication with a gaming terminal 20 (in some instances the carousel controller 31/site controller 34 is replaced with a single site controller 34). The data elements are translated into a common XML schema and transmitted electronically from the carousel controller 31 through transmission control protocol/Internet protocol (TCP/IP) across a local area network (LAN) 30 within a gaming site to a site controller 34. The site controller 34 then communicates across a wide area network (WAN) 36 using a standard message queuing software program to the message director. The message director communications server (communications server) 51 in turn distributes the event message to a set of applications residing on a single or multiple servers. The data in the event messages are ultimately posted to a central system database server 42. Likewise, data transmissions from the central system 50 and central system database server 42 are converted into an XML schema and transmitted electronically through the data network to the carousel controller 31, which then translates the XML schema and contained data elements into a format that can be transmitted to a proprietary gaming terminal. Any designated system component can communicate with an external system via the XML protocol.

The message director system may be further enhanced when configured to run on WINDOWS SERVICES. WINDOWS SERVICES are applications that run in the background and perform tasks that do not require user interaction. This configuration is important for the automatic processing of application messages. For example, the message director system can run without a user session. This means that an operator is not required for WINDOWS SERVICES to run, insuring the availability of the system. In addition, WINDOWS SERVICES can be configured to start automatically when the operating system starts, insuring the functionality of the system. The WINDOWS operating system can automatically restart WINDOWS SERVICES that has ended abnormally without user intervention. In essence, WINDOWS SERVICES provides an administrative tool to ensure that the message director system is always available and ready to operate the gaming system. However, the use of WINDOWS SERVICES is optional as it is not essential to the operation of the message director system.

While embodiments of the present invention have been described with reference to one or more particular embodiments, those skilled in the art will recognize that many changes may be made thereto without departing from the spirit and scope of the present invention. Each of these embodiments and obvious variations thereof is construed as falling within the spirit and scope of the claimed invention, which is set forth in the following claim.

What is claimed is:

1. A wide area progressive gaming system, comprising:

a plurality of progressive servers, each progressive server of the plurality of progressive servers dedicated to administering a different one of a plurality of progressive games;

a plurality of gaming terminals remote to the plurality of progressive servers, each of the plurality of gaming terminals being configured to play at least one progressive game of the plurality of progressive games;

a plurality of site controllers, each of the plurality of site controllers configured to manage a subset of the plurality of gaming terminals, and each of the plurality of site controllers configured to:

upon loss of communication between the subset of gaming terminals managed by a particular site controller and at least one of the plurality of progressive servers, continue updating the at least one progressive game as wagers are made on the subset of gaming terminals managed by the particular site controller until the communication is restored; and a communications server to facilitate communication from each of the plurality of gaming terminals to at least one progressive server of the plurality of progressive servers based on a progressive game of the plurality of progressive games for which each of the plurality of gaming terminals is configured.

2. The progressive gaming system described in claim 1, wherein the communications server communicates event messages between the gaming terminals and the appropriate progressive server.

3. The progressive gaming system describing claim 1, further including a support network, the support network connected to each progressive server through the communications server.

4. The progressive gaming system described in claim 3, wherein the support network includes a database server for archiving data from each of the plurality of progressive games.

5. The progressive gaming system described in claim 4, further including a plurality of databases, each one of the plurality of databases associated with one of the plurality of progressive servers, each of the plurality of databases having an archived database stored on the database server.

6. The progressive gaming system described in claim 5, wherein the databases are linked to their associated archived database by software for automatically updating the linked database when a change occurs in either the database or the archived database.

7. The progressive gaming system described in claim 6, wherein the communications server sends event messages between the progressive servers and the gaming terminals.

8. The progressive gaming system described in claim 3, wherein the support network includes a database server and a directory services server.

9. The wide area progressive game system of claim 1, further comprising a support network, the support network connected to each progressive server through the communications server, wherein the support network includes a database server for archiving data from each of the plurality of progressive games.

10. A networked wide area gaming system, comprising:

a plurality of progressive servers, each progressive server of the plurality of progressive servers dedicated to administering a different one of a plurality of shared progressive games;

a plurality of gaming terminals remote to the plurality of progressive servers, each gaming terminal of the plurality of gaming terminals being configured to offer at least one shared progressive game of the plurality of shared progressive games to a player;

a plurality of site controllers, each of the plurality of site controllers configured to manage a subset of the plurality of gaming terminals, and each of the plurality of site controllers configured to:

upon loss of communication between the subset of gaming terminals managed by a particular site controller and at least one of the plurality of progressive servers, continue processing the at least one shared progressive game offered by the subset of gaming terminals managed by the particular site controller until the communication is restored; and a communications server to facilitate communication from each terminal of the plurality of gaming terminals to at least one progressive server of the plurality of progressive servers based on a shared progressive game of the plurality of shared progressive games for which each terminal is configured.

11. The networked gaming system described in claim 10, further including a message director service on the communications server for communicating event messages generated by the shared progressive game between the gaming terminal and its linked progressive server.

12. The networked gaming system described in claim 10, wherein the shared progressive game is a competitive game.

13. The networked gaming system described in claim 10, wherein the shared progressive game is a collaborative game.

14. The networked gaming system described in claim 10, further including linking at least two progressive servers to participate in the same shared progressive game.

15. The networked gaming system described in claim 10, wherein the plurality of progressive servers include a first and second progressive server and provide competitive game play between the first against the second progressive server.

16. The networked gaming system described in claim 15, wherein the players on the gaming terminals connected to the same progressive server may play collaboratively.

17. The networked gaming system described in claim 15, wherein the players on the gaming terminals connected to the same progressive server may play competitively.

18. A networked wide area gaming system, comprising:

a plurality of progressive servers, each progressive server of the plurality of progressive servers dedicated to administering a different one of a plurality of shared progressive games, wherein the plurality of progressive servers include a first and second progressive server and provide competitive game play between the first against the second progressive server;

a plurality of gaming terminals remote to the plurality of progressive servers, each gaming terminal of the plurality of gaming terminals being configured to offer at least one shared progressive game of the plurality of shared progressive games to a player;

a plurality of site controllers, each of the plurality of site controllers configured to manage a subset of the plurality of gaming terminals, and each of the plurality of site controllers configured to, upon loss of communication between the subset of gaming terminals managed by a particular site controller and at least one of the plurality of progressive servers, continue processing the at least one shared progressive game offered by the subset of gaming terminals managed by the particular site controller until the communication is restored; and a communications server to facilitate communication from each terminal of the plurality of gaming terminals to at least one progressive server of the plurality of progressive servers based on a shared progressive game of the plurality of shared progressive games for which each gaming terminal is configured.

* * * * *

UNITED STATES PATENT AND TRADEMARK OFFICE

CERTIFICATE OF CORRECTION

PATENT NO. : 7,771,276 B2
APPLICATION NO. : 11/143874
DATED : August 10, 2010
INVENTOR(S) : Beatty et al.

It is certified that error appears in the above-identified patent and that said Letters Patent is hereby corrected as shown below:

In column 4, line 65, delete "system" and insert -- system; --, therefor.

In column 14, line 55, in Claim 3, delete "describing" and insert -- described in --, therefor.

Signed and Sealed this
Twenty-eighth Day of December, 2010

David J. Kappos
*Director of the United States Patent and Trademark Office*